April 8, 1930.  C. J. LANTERNIER  1,753,424

FLORIST'S WATER FOUNTAIN

Filed April 5, 1929

INVENTOR.
C. J. Lanternier
BY Elwin M. Hulse
ATTORNEY.

Patented Apr. 8, 1930

1,753,424

UNITED STATES PATENT OFFICE

CLEMENT J. LANTERNIER, OF FORT WAYNE, INDIANA

FLORIST'S WATER FOUNTAIN

Application filed April 5, 1929. Serial No. 352,787.

The invention relates to fountains for florists. In packing cut flowers for delivery or shipment florists generally spray the flowers with cold water after they have been packed in boxes, in order that their freshness may be maintained. Rubber bulb sprayers are generally used for this purpose, the water being taken from a bucket or other receptacle. Dirt and débris collect in the bucket and contaminate the water and interfere with the filling of the bulb of the sprayer. The sprayer is put down after use upon any convenient object or dropped into the bucket, the apertures of the nozzle becoming clogged with débris and requiring frequent cleaning out.

The object of my invention is to provide a fountain wherein there is a continuous supply of clean pure water and in which means is provided by which to support the sprayers where they are ready for instant use.

Another object is to provide a fountain that is readily cleaned.

The invention is illustrated in the accompanying drawings in which

Figure 1:
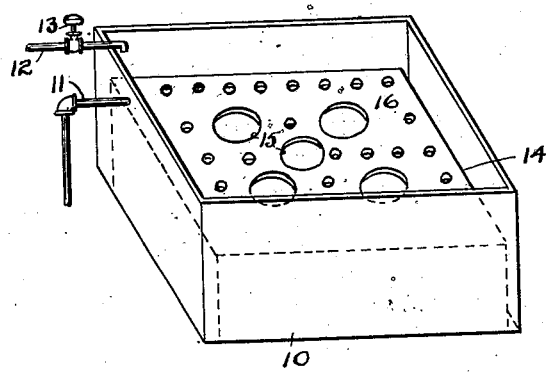
Figure 2:
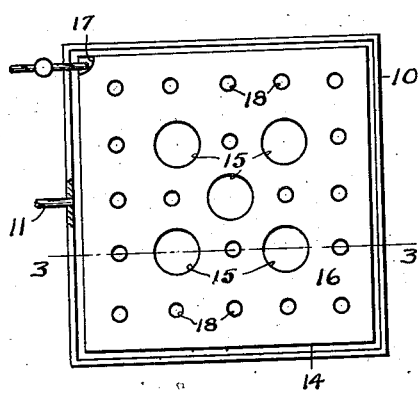
Figure 3:
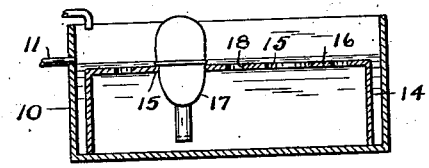

Figure 1 is a perspective view of the fountain; Fig. 2 a plan view of the same; Fig. 3 a cross-section on line 3—3 of Fig. 2 and Fig. 4 a cross-section of a modified form of support for the sprayers.

In the illustrative embodiment of the invention 10 represents an open top tank of suitable size and shape to which, at a suitable point, is connected an overflow conduit 11. A water supply pipe 12 controlled by a valve 13 extends over the top of the tank and continuously discharges water into the tank for such time as the valve 13 is open, the water overflowing through the conduit 11 to a sewer, sink or other suitable or convenient conduit or receptacle. The conduit 11 may be in any form and it may be rigidly secured to the tank and depend therefrom so that the tank and conduit may be moved for thorough cleansing, or the conduit may be fixed and detachably connected to the tank.

Within the tank 10 is a support 14 in the form of a bottomlesss box. A suitable number of apertures 15 are formed in the top 16 of the box in each of which to support a bulb sprayer 17. Other apertures 18 are formed in the top 16 to assure rapid filling of the tank within the box. The top of this support is preferably flush with the outlet to the overflow conduit 11 so that only part of each sprayer is above the water and the height of the top 16 from the bottom of the tank is such that the ends of the nozzles of the sprayers do not touch the said bottom but approach it. The apertures 15 are of the proper size to admit the lower portions of the sprayers, but not the upper portions thereof.

The support 14 is smaller than the interior dimensions of the tank and it rests upon the bottom of the tank with suitable clearance between all or some of its walls of the tank. Since the support rests upon the bottom of the tank it is readily removed therefrom for cleaning both the tank and the support.

To prevent splashing of the water as it descends from the supply pipe 12, I may form an opening 17 in the top 16 of the support 14 which will be disposed in the part of the stream of water and permit some of the same to pass directly through the top 16.

Figure 4:
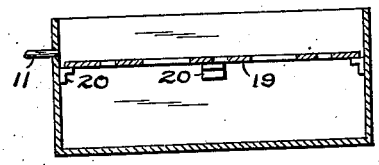

A modified form of support is shown in Fig. 4 in which an apertured plate 19 rests upon suitable flanges 20 projecting from the inner face of the walls of the tank. The plate is supported below the discharge outlet of the tank and the bulb sprayers are supported by the plate in the same manner as they are carried by the support 14.

In use the valve 13 will be opened when the bulb sprayers are to be used, the flow of water through the tank being continuous and at a selected depth while the valve is open. A clean, cool supply of water is thereby assured and the sprayers are always filled with such water while they are supported in the tank. To fill a sprayer it is only necessary to deflate the bulb and drop the sprayer nozzle down into one of the apertures 15. The bulb rapidly fills with water and the sprayer is ready for use.

What I claim is:

1. A water fountain comprising a tank, means to supply a flow of water through the tank at a controlled depth, and a removable support for water sprayers within the tank.

2. A florist's water fountain comprising an open top tank, means to supply a constant flow of water through the tank at a controlled depth and an apertured member removably carried within the tank and having a series of apertures therein adapted to receive bulb sprayers and support them with their lower ends immersed in the water.

3. A florist's water fountain comprising an open top tank, means to supply a constant flow of water through the tank at a controlled depth, and a member supported on the bottom of the tank and in spaced relation thereto and adapted to support water bulb sprayers with their lower ends immersed in the water.

In witness whereof I have hereunto subscribed my name.

CLEMENT J. LANTERNIER.